May 31, 1938. J. BERNARD 2,119,092
MAGNETO
Filed July 23, 1935
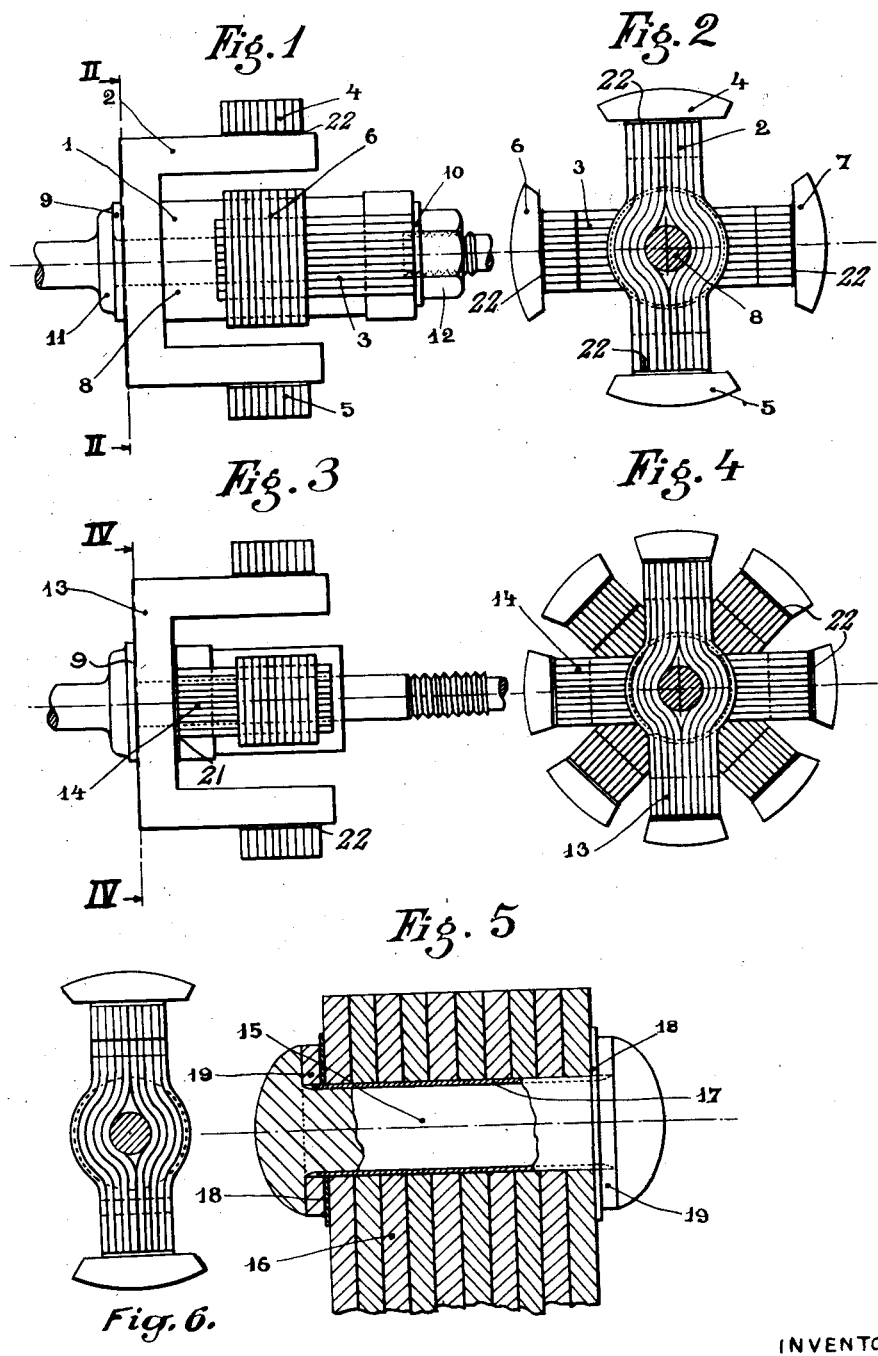
INVENTOR
Jean Bernard
BY
ATTORNEYS Patented May 31, 1938

2,119,092

UNITED STATES PATENT OFFICE 2,119,092

MAGNETO

Jean Bernard, Paris, France

Application July 23, 1935, Serial No. 32,763
In France July 24, 1934

9 Claims. (Cl. 171—252)

My invention relates to field magnets for magnetos, and it aims to provide a magneto capable of affording a very great number of variations of flux per unit of time, thus providing more particularly for the suitable ignition in internal combustion engines having a great number of cylinders and running at a high speed, such as cannot be obtained at the present time, in proper conditions, by the use of the known magnetos.

Field magnets for magnetos are in use which consist of a magnetized straight bar, rotatable on its longitudinal axis and supported by a shaft passing through it, or by two journals located at its center and on its axis, it being provided with conductors of flux situated next the poles at the ends of the magnet, said conductors being suitably held in position and so arranged as to provide a field magnet having two, four or eight poles, or more, rotating in a given plane.

My invention has for its object a particular embodiment of a field magnet of the above-mentioned type, which will obviate the drawbacks of the known devices, that is, it will prevent Foucault currents which take place in solid distributing members or in the ends of the magnet during the displacements of the flux, as well as the reluctances due to numerous joints or air-gaps between the sheets forming the laminated pieces, while at the same time allowing a great facility for mechanical construction.

For this purpose, and this forms one of the improvements covered by the present invention, the magnetic conductors consist each of a piling of plates which are parallel to the axis of rotation of the magnet and are in contact with the latter by means of their edges which are applied against the flat ends of the said magnet, the plates being quite continuous. Further, the said conductors carry at their ends, separately-secured pole-pieces consisting of members which are laminated perpendicularly to the axis of rotation. It is obvious that in this manner the flux may proceed either directly from any point of the pole surface of the magnet to any point at the extreme end of the conductor device thus formed, or directly from any point of a pole-piece to a point at the farthest distance from the other pole-piece, following the plates of the laminated piece, without being obliged to pass through solid pieces giving rise to Foucault currents, and without being obliged to traverse numerous air-gaps, thus obtaining a minimum reluctance during the operation of the apparatus.

On the other hand, in practice, the laminated conductor above-mentioned is bent aside in order to afford passage, through its centre, for the member by which the said piece is held upon the magnet. Again, the proportions of the conductor which is in contact with the flat face of the magnet, its width, and its radii of curvature, are so determined that its section will be sufficient to give passage to the flux and in order that the whole of the pole surface of the magnet shall be covered, so as to collect all of the lines of force issuing from the same at each point, and in order that all of the plates shall have the same developed length, which permits the practical construction of the conductor with the greatest facility by the assembling of plates cut to the same shape and size, before the bending operation.

A further characteristic of the invention consists in the fact that on the conductors receiving the flux from the magnet, the surface of the conductor located on the side opposite the magnet is electrically insulated from the member which is applied against it, in order to prevent short-circuits between the plates, which are favorable to Foucault currents, and this insulation may have, in some cases, only an insignificant magnetic reluctance.

The accompanying drawing shows by way of example two constructional forms of a magneto field embodying the aforesaid features, and having other advantageous characteristics.

Fig. 1 is a lengthwise view of a four-pole field.

Fig. 2 is a cross-section of the same along line II—II of Fig. 1.

Fig. 3 is a partial lengthwise view of an eight-pole field, one conducting piece being taken away at one end of the magnet.

Fig. 4 is a cross-section of the same along line IV—IV of Fig. 3.

Fig. 5 is a view on a larger scale, showing particular features of the riveting of the plates of the laminated members.

Fig. 6 is a cross-section through a two-pole field.

In Figs. 1 and 2, I is the magnet, which has in this case a cylindrical form and 2 and 3 are the conductors of flux which are mounted on the pole ends of the magnet I and are laminated in a direction parallel to the axis of rotation of the magnet.

In the present device, the flux conductors 2 and 3 are two in number, and each has the form of a fork with two branches, the conductors being mounted 90° apart, with the branches facing each other. At their outer ends the fork branches carry pole-pieces 4, 5, 6, 7, which are so arranged that during the rotation, their paths will coincide, the said pole-pieces being adapted for the distribution of the flux in the armature, not shown, which has a circular disposition around the various pole-pieces. The field thus constructed has four poles.

The conductors of flux 2 and 3 consist each of a piling of fork-shaped plates which are parallel to the axis of rotation of the magnet and applied by their edges against the flat surface of the corresponding end of the magnet.

In one of the improvements according to my invention, all of the plates of the laminated parts are quite continuous from one pole to the diametrically opposite one and they are bent aside in order to allow a free space for the insertion of a central piece 8 which forms the supporting part for the rotation and also the central part for pressing the conductors of flux against the ends of the magnet. In this manner, the flux proceeding from a point of contact of a conductor with the magnet may move through this conductor from a pole-piece of this conductor to the other pole-piece of the same in the direction of the plates, without traversing any solid piece, and without breach of continuity in the metal except at the joints between the pole-pieces 4—5 and the conductor 2, or 6—7 and the conductor 3.

The proportions, the width of the conductor and the bending of the plates to surround the central shaft are determined in such manner that the section of the conductor will be sufficient to assure the passage of the flux, and that the whole surface of the end of the magnet shall be covered, in order to collect all of the lines of force issuing at each point, and that all of the plates shall have the same developed length, thus permitting to obtain, in practice, the piece forming the conductor with the greatest facility, by the assembling of plates having the same outline, before bending the latter. Therefore the bent part comprises a circular portion partially surrounding the central journal and two concave circular portions provided respectively one on each side of said circular portion.

Further, the lamination of the pole-pieces 4, 5, 6, 7, is perpendicular to the axis of rotation. It will be noted that owing to the different directions of the lamination in the conductors of flux and in the pole-pieces, the flux is enabled, during the whole operation of the apparatus, to move from any point to another of the system, for instance from a point in the pole-piece 4 to another in the pole-piece 5, or from a point in the magnet to any point in these masses, without being obliged to traverse any solid piece or numerous air-gaps, thus avoiding the formation of Foucault currents, while at the same time the reluctance is as small as is possible to obtain in practice.

This arrangement is completed by the interposition of electrically insulating washers 9 and 10, which are mounted between the conductors 1 and 2 and the pressing members such as 11 and 12, in order that the application of these metallic members, on the one hand, and of the magnet on the other hand, shall not form, with the plates of the lamination, electric short-circuits which would allow the circulation of Foucault currents.

Figs. 3 and 4 show a very simple form of an eight-pole field, obtained by mounting on each pole of the magnet, two conductors of flux, such as 1 in Fig. 1, herein designated as 13 and 14.

In this case, it is preferable to place between two laminated conductors such as 13 and 14, electric insulation 21 of any kind, for instance an insulating washer or varnish, in order to obviate any circuit which may be favorable to Foucault currents, and which would be produced by the placing in contact, or in short-circuit, of the plates of one conductor by the other plates situated at right angles of another conductor, this insulation being as thin as possible in order to introduce only an insignificant magnetic reluctance into the circuit.

On the other hand, in order to prevent the assembling rivets of the plates of the laminated assemblage from short-circuiting these plates and thus producing parasitic currents which would cause disturbances in the working of the magneto, the rivets 15 are electrically insulated from the plates 16 which they unite together.

For this insulation, it is found advantageous to employ mica in the form of a tube 17 which surrounds the rivet and is inserted into the rivet hole before the rivet is placed in position, or it may be placed over the rivet before the latter is mounted in position, and may thus be inserted at the same time as the rivet. This insulation is preferably completed by the interposition of insulating washers 18, for instance of mica, between each rivet head and the corresponding outer plate; each washer is placed around the extending end of the tube 17, and the washer also extends beyond the head of the rivet.

On the other hand, in order to provide for the transverse expansion of the rivets during riveting operation, as this expansion may burst the insulating sleeve, the rivet extends sufficiently outside of the set of plates in order that the expanded part, after the riveting operation, shall be located at the exterior of the plates, the excess of length of the rivet being taken up by interposing a suitable washer 19, which may be of steel without inconvenience.

Furthermore, in order that the plates of the pole-pieces and the plates of the magnetic conductors, which are crossed in position, shall not be mutually placed in short-circuit, which would also be a source of parasitic currents, electric insulating but magnetic conductive means 22, as thin as possible, is interposed between each pole-piece and the branch of the magnetic conductor upon which it is mounted. The insulation should be very thin, in order to avoid a gap which would act against the magnetic flux. It has been found in practice that it is advantageous, in order to obtain the said insulation in the best conditions, to employ mica in the form of a very thin sheet, whose thickness may be for instance 0.005 to 0.007 millimetre.

Obviously, the invention is not limited to the embodiments herein described and represented. It is possible, for instance, to construct in the manner indicated, a field having only two poles (Fig. 6) by cutting off, close to the magnet, one of the branches of each conductor 2 and 3, shown in Fig. 1.

What I claim is:

1. In a magneto, a field magnet comprising a magnetized straight bar supported to rotate on its longitudinal axis and having opposite pole ends, conductors of flux secured on said pole ends, each of said conductors having at least one branch extended in a direction substantially parallel to the magnet axis and being laminated in a direction parallel to the axis of rotation of the magnet, and pole-pieces provided respectively on the free ends of said branches and laminated in a direction perpendicular to the axis of rotation.

2. In a magneto, a field magnet comprising a magnetized straight bar supported to rotate about its longitudinal axis and having opposite flat pole ends perpendicular to said axis, laminated conductors of flux secured on said pole ends and shaped to have each at least one branch substantially parallel to said axis, each of said conductors consisting of a set of plates piled and united together and perpendicularly applied by their edges against the corresponding flat pole, each of said plates extending on each side of a plane containing said axis and perpendicular to said plates, and pole-pieces provided respectively on the free ends of said branches and laminated in a direction perpendicular to the axis of rotation.

3. In a magneto, a field magnet comprising a magnetized straight cylindrical bar having opposite pole ends perpendicular to the cylinder axis, trunnions or like axial journal members centrally projecting from said pole ends and adapted to support said bar, laminated conductors of flux secured on said pole ends and shaped to have each at least one branch substantially parallel to said axis, each of said conductors consisting of a set of plates piled and united together and perpendicularly applied by their edges against the corresponding pole end, each of said plates extending on each side of a plane containing said axis and perpendicular to said plates and being further bent to surround the corresponding central journal member, and pole-pieces provided respectively on the free ends of said branches and laminated in a direction perpendicular to said axis.

4. In a magneto, a field magnet comprising a magnetized straight cylindrical bar having opposite pole ends perpendicular to the cylinder axis, trunnions or like axial journal members centrally projecting from said pole ends and adapted to support said bar, laminated conductors of flux secured on said pole ends and shaped to have each at least one branch substantially parallel to said axis, each of said conductors consisting of a set of plates piled and united together, each of said plates having a part transverse to a plane containing said axis and perpendicular to said plates so as to extend on each side of said plane and having further the said transverse part applied by its edge against the corresponding pole end, said transverse part being locally bent to surround the corresponding central journal, and pole-pieces provided respectively on the free ends of said branches and laminated in a direction perpendicular to said axis, said bent transverse part comprising two concave circular portions provided respectively one on each side of a circular portion, these concave portions of the transverse part having the same radius and equal radii of curvature.

5. In a magneto, a field magnet as in claim 1 and comprising a plurality of conductors of flux piled up against each pole end of the bar, the various branches of the conductors on one and the same pole being angularly spaced apart.

6. In a magneto, a field magnet as in claim 1 and comprising a plurality of conductors of flux piled up against each pole end of the bar, the various branches of the conductors on one and the same pole being angularly spaced apart, and electric insulating but magnetic conductive means interposed between any two adjacent conductors.

7. In a magneto, a field magnet comprising a magnetized straight bar supported to rotate on its longitudinal axis and having opposite pole ends, conductors of flux provided on said pole ends, each of said conductors having at least one branch extended in a direction substantially parallel to the magnet axis and said conductors consisting each of a piling of plates which are parallel to the axis of rotation of the magnet, pole-pieces provided respectively on the free ends of said branches and laminated in a direction perpendicular to the axis of rotation, clamping means for pressing said conductors against the pole ends and electrically insulating means interposed between said clamping means and the adjacent magnetic conductor to prevent electric conductive engagement between said clamping means and the magnetic conductor.

8. In a magneto, a field magnet as in claim 1, comprising further electric insulating but magnetic conductive means interposed between each pole piece and the branch of the conductor on which it is provided.

9. In a magneto, a rotary field magnet including a rotatable magnet and laminated conductors of flux provided on the magnet poles, said conductors comprising each a set of plates, rivets uniting together said plates, each rivet having a stem the length of which is greater than the thickness of the set of plates, a tube of mica surrounding the rivet stem and projecting from the plates at its both ends, but somewhat shorter than the stem, insulating washers threaded upon the projecting ends of said tube and metallic making up washers between the insulating washers and the rivet heads.

JEAN BERNARD.